May 9, 1961

L. J. RASERO 2,983,304

POWER TRANSMISSION AND CONVEYOR BELT AND METHOD OF MAKING SAME

Filed March 12, 1959

INVENTOR
LAWRENCE J. RASERO
BY
ATTORNEY

United States Patent Office 2,983,304
Patented May 9, 1961

2,983,304

POWER TRANSMISSION AND CONVEYOR BELT AND METHOD OF MAKING SAME

Lawrence J. Rasero, Middletown, Conn., assignor to The Russell Manufacturing Company, Middletown, Conn., a corporation of Connecticut Filed Mar. 12, 1959, Ser. No. 798,936

9 Claims. (Cl. 154—4)

This invention relates to conveyor or power transmission belts and a method of making the same.

An object is to provide a belt of the above type having novel and improved characteristics.

Another object is to provide a belt composed of a woven fabric impregnated with a synthetic resin in which the fabric is loosely woven to receive the resin impregnant and in which the warp yarns are so disposed as to provide longitudinal strength combined with a high degree of flexibility.

Another object is to provide a woven fabric for the above purpose in which the warp yarns are woven as binders forming loops adapted to receive the impregnant and are disposed to form chains for at least a portion of their length wherein the chains are bonded to the resin impregnant to constitute the tension elements of the belt.

Another object is to provide a multiple ply fabric of the above type wherein the filler yarns of the outer plies are bound by binder yarn loops and wherein the binder yarns form chains with the filler yarns of the inner ply or plies.

Another object is to provide a woven fabric of the above type wherein the warp yarns are unstressed at the surface of the belt whereby the tendency of these yarns to be cut or damaged by contact with heavy objects is reduced.

Another object is to provide a woven multiple ply fabric for the above purpose which is so loosely woven as to be suited for impregnation with a synthetic resin and which when so impregnated has the necessary strength and flexibility for use as a conveyor belt or a power transmission belt.

Another object is to provide a woven fabric which is particularly suited for impregnation with polyurethane to produce a belt of the above type.

Another object is to provide a belt containing a plurality of differently characterized yarns which, in combination with the polyurethane resin, impart improved resilience, tensile strength and transverse tear resistance to the belt.

Heretofore it has been proposed to produce power and transmission belts by impregnating a woven fabric with polyvinyl chloride due to the ease of impregnation of this material. However, such belts have relatively low tensile strength which makes them unsuitable for many purposes. It is accordingly a further object of this invention to provide a belt in which a higher strength resin, such as polyurethane, is used as the impregnant and to provide a fabric base having a weave structure and yarn characteristics which are particularly adapted for impregnation with such a high strength resin.

In accordance with the present invention the fabric is loosely woven from a plurality of different yarns. Transverse tear resistance is provided by using for the filler yarns relatively heavy cabled cords of spun nylon or spun Dacron. The filler yarns are disposed in a plurality of plies, for example three plies or four plies. The warp yarns are woven as chains to bind the fillers of the inner ply or plies and extend upwardly at intervals to form loops over spaced filler yarns of the outer plies. This weave imparts improved flexibility because there are no warp yarns extending directly between adjacent filler yarns of the outer plies. At the same time the chain yarns in the inner plies provide the tensile strength for the belt.

A combination of different warp yarns is used. One of the warp yarns is composed of soft, loosely spun cotton. Cotton is resistant to damage by contact with heavy or sharp objects such as objects which may be conveyed by a conveyor belt. Also it does not bond readily to polyurethane but forms a tubular opening in the resin which improves the resilience of the belt. Other warp yarns are made of spun Dacron a condensation polymer of ethylene glycol and trephthalic acid or of spun nylon. The Dacron has the property of bonding strongly to the polyurethane to form a firm structure. The nylon bonds less strongly and has a high tensile strength. Still other warp yarns are composed of continuous filament Dacron or nylon which are relatively small in diameter and have a high tensile strength. This combination of yarns is repeated in the various dents across the fabric to form a belt having the above characteristics.

In the above type of weave wherein the high strength chain yarns are brought up to the surface at spaced points to form loops over the outer filler yarns the chain yarns must be strongly bonded to the resin for holding the yarns in place, particularly if they are displaced from the pitch line.

The present invention provides yarns for this purpose which are strongly bondable to the polyurethane and also yarns which are less readily bondable and produce voids in the polyurethane which improve the flexibility of the belt.

In one embodiment a heat-shrinkable yarn such as filament or spun Dacron or polyethylene may be used as the filler yarns and the fabric may be loosely woven to provide open spaces between the warp yarns to receive the impregnant. The fabric may be impregnated while the filler yarns are in unshrunken state, and then heated to a temperature sufficient to shrink the filler yarns and thereby compact and contract the weave while setting the resin.

In accordance with this invention the fabric is so loosely woven that it would lack the stiffness and firmness required for belting purposes prior to impregnation. However, after impregnation and setting the product aquires a combination of stiffness, flexibility and resistance to abrasion which makes it suitable for use as power or transmission belting.

Other objects and advantages will be apparent from the following detailed description, taken in connection with the drawing in which certain specific embodiments have been set forth for purposes of illustration.

Figure 2:
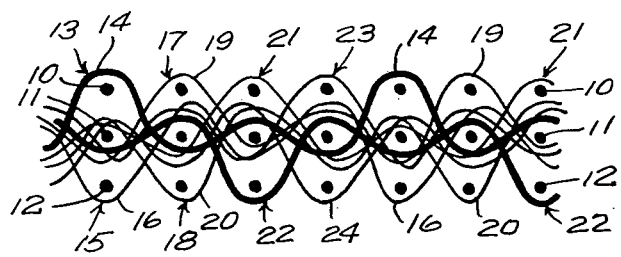
Fig. 2 is a diagrammatic view of a fabric weave embodying the invention.

Referring to the drawing more in detail, Fig. 2 illustrates an open weave having three plies of filler yarns 10, 11 and 12 respectively.

The warp yarns are woven as chains binding the inner row 11 of filler yarns with each warp yarn extending upwardly or downwardly at intervals to form loops in which the upper and lower rows 10 and 12 of filler yarns are bound.

In the form shown in Fig. 2 a warp yarn 13 extends upwardly to form a loop 14 over a first filler yarn 10, thence as a chain under and over and under second, third and fourth filler yarns 11 respectively, and upwardly in a loop 14 over a fifth filler yarn 10. This pattern is repeated along the weave with the warp yarn 13 forming loops 14 over every fifth filler yarn 10 of the upper ply and constitutes a chain in the intermediate ply between said loops.

A second warp yarn 15 is woven as a mirror image of the yarn 13. The yarn 15 extends in loops 16 under a first filler yarn 12 of the lower ply in every fifth column and forms, with the yarn 13, a double chain to bond the filler yarn 11 in the intermediate ply between the loops 16.

A second pair of warp yarns 17 and 18 is woven in the same pattern as the warp yarns 13 and 15 but forms loops 19 and 20 which are displaced by one column of filler yarns from the loops 14 and 16. Third and fourth pairs of warp yarns 21, 22 and 23, 24 are similarly woven and displaced by one filler yarn so that each filler yarn 10 and 12 of the outer plies is bound by one of the warp yarns of each group of the warp yarns above described.

In the above described weave the yarns are spaced to provide an open weave with spaces between adjacent yarns to receive the resin.

Also the upwardly and downwardly extending loops are sufficiently open and loose to receive the resin impregnant.

In this embodiment the filler yarns 10, 11 and 12 are composed of cabled cords of spun nylon or spun Dacron. The warp yarns 13 and 15 may be composed of loosely twisted cotton, the warp yarns 17 and 18 of spun nylon, the warp yarns 21 and 22 of spun Dacron, and the warp yarns 23 and 24 of continuous filament nylon or Dacron.

The yarns are loosely woven to form an open porous fabric which can be impregnated with the resin without wicking or filtering action, but which in the unimpregnated state would lack the strength and stiffness required for belting purposes. The fabric when impregnated with a resin in liquid form, such as polyurethane, is capable of picking up and retaining from 75% to 150% of its weight of resin.

The fabric may be impregnated with polyurethane which has been mixed with isocyanate and is in the state of a viscous liquid. Such a mixture has the property of setting rapidly when cold although the setting time can be shortened by heating.

The fabric can be dipped and squeezed between rollers to eliminate air pockets and then calendered or passed under a doctor blade to remove excess resin and reduce the material to the required thickness. It may then be held at room temperature or heated in a heating zone until the resin has set.

Figure 1:
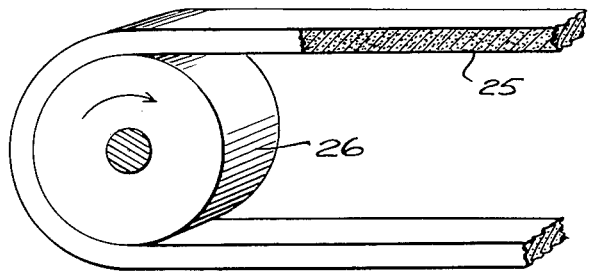
Fig. 1 is a broken perspective view of a belt embodying the invention.

The web 25 thus formed may be passed around a roller 26 as shown in Fig. 1 as a conveyor or power transmission belt and has the characteristics required for conveyor and power transmission purposes.

In the belt the warp yarns are individually supported in the resin rather than by contact with each other. The heavy filler yarns provide surface strength and resistance to transverse tearing. The combination of warp yarns above set forth provides high tensile strength and flexibility.

While other resins may be used for certain purposes the polyurethane is particularly useful due to its homogeneous liquid state which permits it to be absorbed by dipping or padding without filtering out or concentration of any component as would be the case with a less homogeneous liquid. In this weave the chain warps which provide the tensile strength are all disposed in the center ply which is at the pitch line of the belt. The fillers of the outer plies are bound loosely by spaced loops to provide maximum flexibility.

Figure 3:
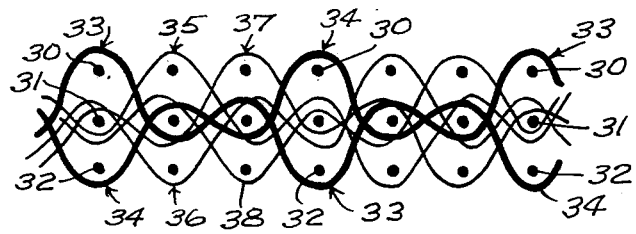
Figs. 3 and 4 are similar diagrammatic views illustrating further embodiments of the weave.

The embodiment of Fig. 3 shows a three-ply weave having three rows of filler yarns 30, 31 and 32. A warp yarn 33 passes as a loop over a first filler yarn 30 in the upper row, then under and over a second and third filler yarn 31 in the second row, then as a loop under a fourth filler yarn 32 in the lower row, then over and under a fifth and sixth filler yarn 31 in the center row and in the form of a loop over a seventh filler yarn 30 in the upper row. A second warp yarn 34 passes under a first filler yarn 32 in the lower row, then over and under a second and third filler yarn 31 of the center row as a double chain with the warp yarn 33, then over a fourth filler yarn 30 of the top row, etc.

Other pairs of warp yarns 35 to 38 are woven in the same pattern as the warp yarns 33 and 34 but are relatively displaced by one filler yarn so that each filler yarn 30 and 32 is bound by at least one warp yarn of the group.

The product is generally similar to that of Fig. 2 in that the warps are disposed as chains in the center row and extend upwardly and downwardly as loops to bind the filler yarns of the outer plies.

Figure 4:
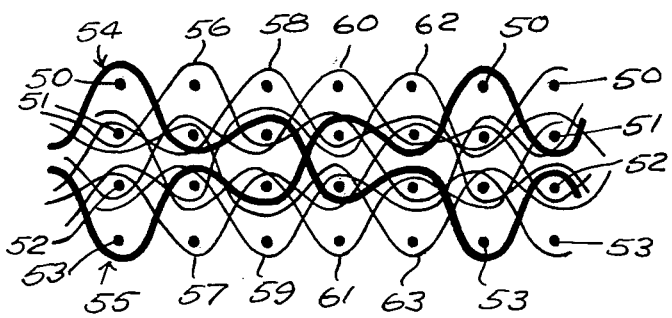

In the embodiment of Fig. 4 the filler yarns 50 to 53 are arranged in four plies and the warp yarns form chains in the inner rows and loops around the filler yarn of the outer plies. A warp yarn 54 is woven over a first filler yarn 50, then under and over second and third filler yarns 51, then under and over fourth and fifth filler yarns 52, then in a loop under a sixth filler yarn 53, then over and under a seventh and eighth filler yarn 52 (not shown) and then returns in a similar manner through the various plies in a repeated pattern. A mating warp yarn 55 is woven to form a loop under a first filler yarn 53, then as a double chain with the warp yarn 54 in the second and third rows and over a sixth filler yarn 50 in the top row. Other pairs of warp yarns 56 to 63 are woven in the same pattern as the warp yarns 54 and 55 but are relatively displaced by one filler yarn each.

The fabrics of Figs. 3 and 4 are impregnated to form a belt of the above type. Obviously the number of plies can be increased according to the thickness and strength desired for the belt.

The various groups of warp yarns in Figs. 3 and 4 include a combination of at least one cotton yarn, at least one spun Dacron yarn, at least one spun nylon yarn, and at least one continuous filament nylon or Dacron yarn. The filler yarns in at least the outer plies are composed of cabled spun nylon or spun Dacron yarn are set forth above.

What is claimed is:

1. A belt of the character described comprising a multiple ply woven fabric having a pair of outer plies and at least one intermediate ply, each ply having a row of filler yarns, double chain warp yarns woven with the filler yarns of said intermediate ply only and constituting the tension elements of the belt, each of said warp yarns being raised to form a loop over selected regularly spaced single filler yarns of the outer rows, the loops of successive warp yarns of a group being displaced to bind different filler yarns whereby each outer ply filler yarn is bound solely by said loops which permit limited longitudinal displacement thereof as the belt is flexed, at least some of said double chain warp yarns being composed of a condensation polymer of ethylene glycol and terephthalic acid, said fabric being embedded in and bonded by polyurethane.

2. A belt as set forth in claim 1 in which said outer filler yarns are composed of cabled spun yarn formed of a condensation polymer of ethylene glycol and terephthalic acid.

3. A belt as set forth in claim 1 in which said outer ply filler yarns are composed of a cabled spun nylon.

4. A belt as set forth in claim 1 in which at least some of said warp yarns are composed of loosely twisted cotton yarns.

5. A belt as set forth in claim 1 in which each group of warp yarns includes a cotton yarn, a spun Dacron yarn, a spun nylon yarn and a continuous filament synthetic yarn.

6. A belt as set forth in claim 1 in which said fabric is so loosely woven as to provide spaces for impregnant between adjacent yarns and in the unimpregnated state lacks the stiffness and dimensional stability required for belting purposes.

7. A belting as set forth in claim 6 in which said synthetic resin is present in an amount of at least 75% of the weight of the fabric.

8. A belting as set forth in claim 1 in which said filler yarns are composed of a heat-shrinkable yarn in the heat-shrunk state.

9. The method of making a fabric belting which comprises forming a multiple ply fabric having chain warp yarns and filler yarns in a loosely woven state in which successive yarns are separated to provide a space for an impregnant therebetween, said filler yarns being composed of a heat-shrinkable material in unshrunken state, impregnating said fabric with at least 75% of its weight of a heat-settable synthetic resin, and subjecting the impregnated fabric to heat adapted to shrink said heat-shrinkable yarns for contracting and compacting said fabric in a filler-wise direction and set said resin.

References Cited in the file of this patent

UNITED STATES PATENTS

| | | |
|---|---|---|
| 1,477,886 | Lewis | Dec. 18, 1923 |
| 2,242,128 | Hornsby | May 13, 1941 |
| 2,432,427 | Kuhn | Dec. 9, 1947 |
| 2,841,515 | Runton | July 1, 1958 |

FOREIGN PATENTS

| | | |
|---|---|---|
| 712,040 | Great Britain | July 14, 1954 |
| 715,405 | Great Britain | Sept. 15, 1954 |